United States Patent [19]

Hiramatsu

[11] Patent Number: 4,538,482

[45] Date of Patent: Sep. 3, 1985

[54] HYDRAULIC CONTROL SYSTEM IN AUTOMATIC TRANSMISSION GEAR FOR 4 ADVANCE SPEEDS

[75] Inventor: Takeo Hiramatsu, Kyoto, Japan

[73] Assignee: Mitsubishi Jidosha Kogyo Kabushiki Kaisha, Tokyo, Japan

[21] Appl. No.: 433,220

[22] Filed: Oct. 7, 1982

[30] Foreign Application Priority Data

Oct. 31, 1981 [JP] Japan ................. 56-175055

[51] Int. Cl.³ ............................................. B60K 41/06
[52] U.S. Cl. ......................................... 74/869; 74/867
[58] Field of Search ........................ 74/869, 868, 867

[56] References Cited

U.S. PATENT DOCUMENTS

| 3,638,771 | 2/1972 | Chana ................. | 74/869 X |
| 3,756,358 | 9/1973 | Espenschied et al. ..... | 192/0.09 |
| 3,938,410 | 2/1976 | Dach et al. ........... | 74/869 |
| 4,325,271 | 4/1982 | Iwanaga et al. ........ | 74/869 |
| 4,367,528 | 1/1983 | Kawamoto et al. ...... | 74/866 X |
| 4,430,910 | 2/1984 | Lemieux et al. ....... | 74/867 |

FOREIGN PATENT DOCUMENTS

| 0026925 | 4/1981 | European Pat. Off. ...... | 74/869 |
| 2333099 | 1/1975 | Fed. Rep. of Germany ..... | 74/869 |
| 0142151 | 11/1980 | Japan ................... | 74/867 |

Primary Examiner—Leslie A. Braun
Assistant Examiner—Dwight G. Diehl

[57] ABSTRACT

In an automatic transmission system comprising 3 clutches including a 4th speed clutch for achieving the 4th speed of over-drive operated by oil pressure and by connecting an input shaft with a carrier of the ravigneawx type planetary gear set and 2 brakes, it is necessary to engage the 4th speed clutch and one brake in order to obtain the 4th speed of over-drive. On the other hand, the other two clutches must be engaged in order to obtain the 3rd speed. Therefore, timely engagement of one clutch for the 3rd speed having a greater torque transmitting capacity at the time of shifting down from the 4th to the 3rd speed becomes difficult. In order to overcome this disadvantage, a hydraulic control system in an automatic transmission is so constructed that a 3rd speed clutch having a smaller torque transmitting capacity is engaged after one brake for the 4th speed has been released in order to increase the oil pressure which was kept at a lower pressure during shifting with the synchronization of the rotation of two arbitrary rotary elements in the gear shift unit and to supply another clutch having a greater torque transmitting capacity with pressurized oil, thereby achieving smooth shifting without shocks.

3 Claims, 5 Drawing Figures

| select lever & auxiliary switch | | P | R | N | D4 | | | | D3 | | | 2 | | L | |
|---|---|---|---|---|---|---|---|---|---|---|---|---|---|---|---|
| shifting gear | | - | R | - | 1st | 2nd | 3nd | 4th | 1st | 2nd | 3nd | 1st | 2nd | 1st | 2nd |
| friction engagement devices | front clutch 11 | ○ | | | | | ○ | | | | ○ | | | | |
| | rear clutch 12 | | | | ○ | ○ | ○ | | ○ | ○ | ○ | ○ | ○ | ○ | ○ |
| | kick down brake 14 | | | | | ○ | | ○ | | ○ | | | ○ | | ○ |
| | low reverse brake 15 | ○ | ○ | | | | | | | | | ○ | | ○ | |
| | one way clutch 16 | | | | ⊘ | | | | ⊘ | | | ⊘ | | | |
| | 4th speed clutch 13 | | | | | | ○ | ○ | | | ○ | | | | |
| transmission ratio | | - | 2.176 | - | 2.846 | 1.581 | 1.000 | 0.685 | 2.846 | 1.581 | 1.000 | 2.846 | 1.581 | 2.846 | 1.581 |

Control Pressure

Control Pressure

HYDRAULIC CONTROL SYSTEM IN AUTOMATIC TRANSMISSION GEAR FOR 4 ADVANCE SPEEDS

BACKGROUND OF THE INVENTION

The present invention relates to an improvement in a hydraulic control system for automatic transmission with 4 forward speeds and it aims to prevent shocks caused by shifting down from the 4th speed of over-drive to the directly connected 3rd speed.

There is a growing demand in recent automobile industry for higher efficiency and less energy consumption not only in the engine but also in other various devices such as the automatic transmission, etc. An automatic transmission system with 4 forward speeds including the over-drive has been introduced to meet such demands, which enables automatic shifting in correspondence with the driving conditions of a vehicle by means of a device for controlling the oil pressure.

An example of such automatic transmission system is provided with a 4th speed clutch which connects the input shaft (an output shaft of a torque converter) with a carrier of a ravigneawx type planetary gear set to achieve the over-drive. In this system, the oil pressure is so controlled that the 4th speed clutch is engaged with one of the brakes, i.e. a kick-down brake when the 4th speed is obtained, whereas when the 3rd speed is obtained, two other different clutches, i.e. a front clutch and a rear clutch, are engaged. In obtaining the 3rd speed, the 4th speed clutch is engaged in advance to prevent shocks at the time of upward shifting.

In the automatic transmission gear system of this construction, however, it is necessary to newly engage the front clutch and the rear clutch after at least the kick-down brake has been released when shifting down from the 4th to the 3rd speed and in doing so timely engagement of the rear clutch which has a greater torque transmitting capacity is especially difficult, and causes shifting shocks.

SUMMARY OF THE DISCLOSURE

The present invention aims to provide an oil pressure controlling system for automatic transmission with 4 forward speeds which is capable of preventing shocks caused at the time of shifting from the over-drive at the 4th speed to the directly connected 3rd speed. The oil pressure control system according to the present invention to be employed in an automatic transmission system comprising 3 clutches operated by oil pressure including at least the 4th speed clutch used for connecting the input shaft and the carrier of the ravigneawx type planetary gear set to obtain the 4th speed with over-drive and two brakes, is characterized in that it is provided with a means to detect the rotational speed at which two arbitrary rotary elements of said ravigneawx type planetary gear set synchronize when a brake which had been engaged for obtaining the 4th speed is released and when a first clutch of two clutches for the 3rd speed having a smaller torque transmitting capacity is engaged, an oil pressure controlling means which controls the oil pressure to be supplied to said clutch or brake at a lower value during shifting and which increases said supply oil pressure by detecting said synchronization by means of the signals from said means for detecting the rotational speed, and a switch valve which starts supplying the oil pressure to a second clutch for the 3rd speed having a greater torque transmitting capacity by switching ON/OFF in correspondence with the increase in the oil pressure supplied to said first clutch.

DETAILED DESCRIPTION OF THE INVENTION

Figures 1, 2:
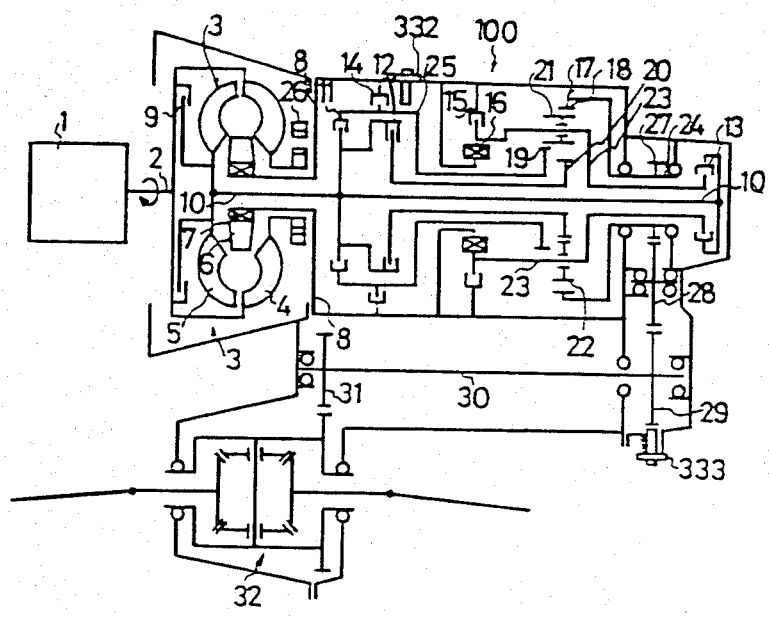
FIG. 1 shows a power train of an automatic transmission system for vehicles to which the present invention is applicable.
FIG. 2 shows the state of each friction engagement device in relation to the position of the selector lever.

One embodiment of the present invention will now be described with reference to the accompanying drawings.

The automatic transmission system which is the object of control will be explained as to its structure using the power train shown in FIG. 1.

A crank shaft 2 of an engine 1 which is the power source for a vehicle is directly connected to a pump 4 of a torque converter 3. The torque converter 3 has said pump 4, a turbine 5, a stator 6, a oneway clutch 7, and the stator 6 is connected with a case 8 through the oneway clutch 7 and is so constructed as to rotate in the same direction as the crank shaft 2 by means of the oneway clutch 7 but not to be permitted to rotate in the reverse direction. A directly coupling clutch 9 is provided between the crank shaft 2 and the turbine 5 and directly couples with a predetermined slip ratio.

Thus, the output of the engine 1 is transmitted to the turbine 5 through the directly coupling clutch 9 or the torque converter 3.

The torque transmitted to the turbine 5 is transmitted through an input shaft 10 to a speed change gear assembly 100 which provides 4 forward speeds and 1 reverse speed.

The speed change gear assembly 100 comprises 3 clutches 11, 12 and 13, 2 brakes 14 and 15, a oneway clutch 16 and a ravigneawx type planetary gear set 17.

The planetary gear set 17 comprise an annulus gear 18, a reverse sun gear 19, a forward sun gear 20, a long pinion 21, a short pinion 22 and a carrier 23.

The annulus gear 18 is coupled to an output shaft 24, and the reverse sun gear 19 is coupled to a kick-down drum 25 which can be fixedly coupled to the case 8 through the kick-down brake 14 and is also coupled to the input shaft 10 through the front clutch 11 which is the first clutch having smaller torque transmitting capacity. On the other hand, the forward sun gear 20 is coupled to the input shaft 10 through the rear clutch 12 which is the second clutch having greater torque transmitting capacity. The carrier 23, which carries the long pinion 21 and the short pinion 22 is coupled to the case 8 through the oneway clutch 16, and is also coupled to the input shaft 10 through the 4th speed clutch 13 provided behind of said speed change gear assembly 100 for achieving the 4th speed of over-drive. Further, it can be fixedly coupled to the case 8 through the low reverse brake 15. The oneway clutch 16 is provided to prevent the carrier 23 from rotating in the reverse direction.

These 3 clutches 11, 12 and 13 and 2 brakes 14 and 15 are constituted from the friction engagement devices operated by oil pressure. The oil pressure to be supplied to each hydraulic pistons which activate these friction engagement devices is produced by an oil pump 26.

The output which has passed the speed change gear assembly 100 is transmitted to a transfer driven gear 29 through a transfer drive gear 27 and a transfer idle gear 28 and further to a differential gear 32 through a transfer shaft 30 and a helical gear 31 secured to the transfer driven gear 29.

Each of said friction engagement devices is selectively engaged to obtain variable speeds by manipulating a selector lever at the driver's seat (not shown) and an auxiliary switch for selecting $D_4$, $D_3$, 2 and L to be described later, and in correspondence with the driving conditions of the vehicle that are detected by various detecting means also to be described later.

The select pattern includes P (parking), R (reverse), N (neutral), $D_4$ (automatic change of 4 forward speeds), $D_3$ (automatic change of 3 forward speeds), 2 (automatic change of 2 forward speeds) and L (fixed at 1st speed). The selector lever has 4 positions for P, R, N, and D. The auxiliary switch comprising an inhibitor switch and a shifting switch selects a mode of driving from L, 2, $D_3$ and $D_4$ when the selector lever is positioned at D.

FIG. 2 shows which friction engagement devices operate in what way when the selector lever and the auxiliary switch are positioned at said different select patterns. By selectively operating these friction engagement devices in different combinations as shown in FIG. 2, it is possible to obtain various speeds, i.e. 4 forward speeds and 1 reverse speed.

In the Table (FIG. 2), the mark o denotes that a friction engagement device is in engagement by the action of oil pressure while the mark e denotes that the carrier 23 is locked by the function of the oneway clutch 16 immediately before the low reverse brake 15 is engaged at the time of shifting. The abbreviations 1st, 2nd, 3rd and 4th in the column indicating the positions of the selector lever and the auxiliary switch at $D_4$, $D_3$, 2 and 1 respectively denote the first, second, third and fourth speed.

As is obvious from FIG. 2, it is necessary to engage the front clutch 11 and the rear clutch 12 in order to obtain the 3rd speed. For the 4th speed, engagement of the kick-down brake 14 and the 4th speed clutch 13 instead of said combination of the clutches 11 and 12 is necessary.

Figure 3:
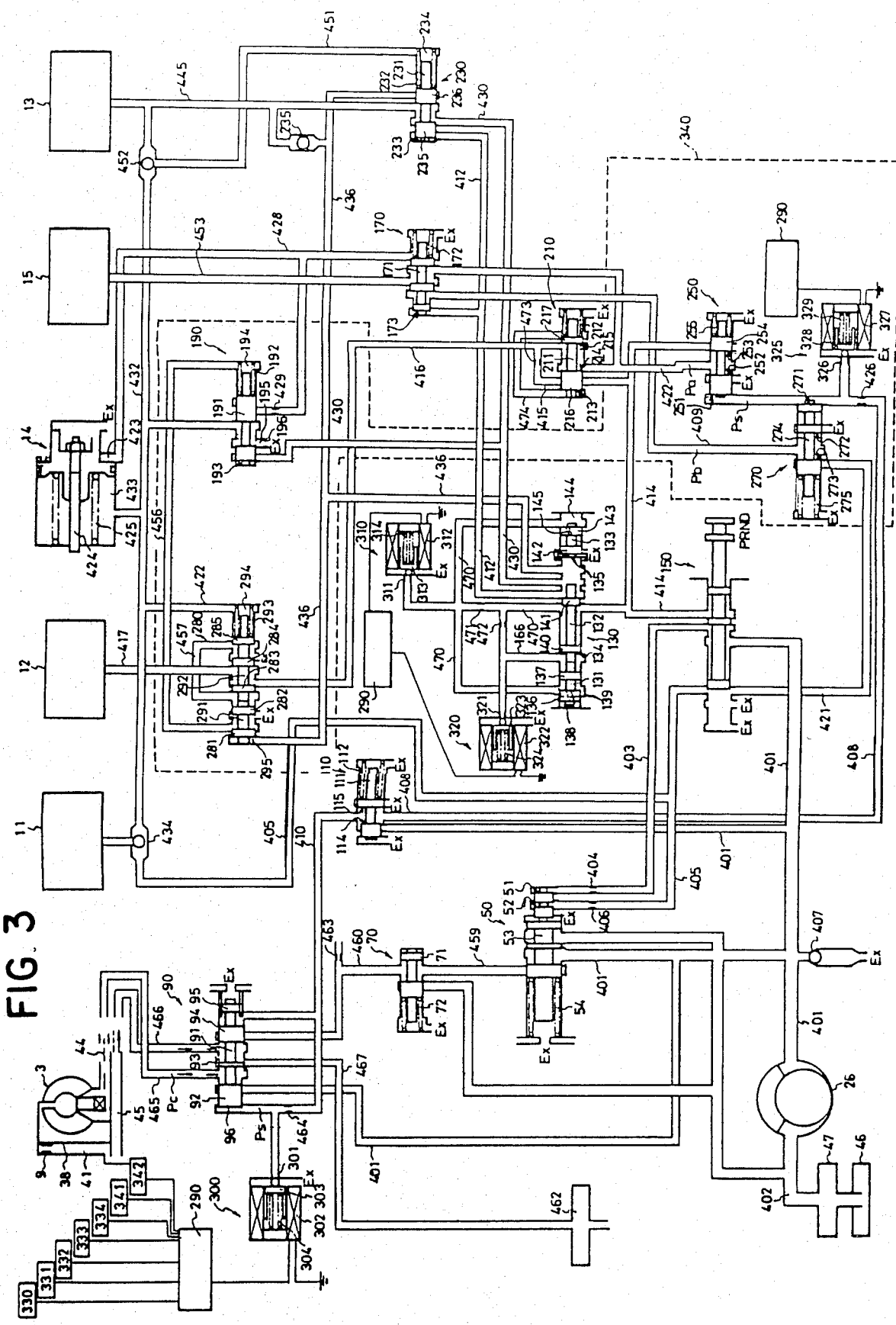
FIG. 3 is a diagram of the main oil pressure control system according to the present invention.

Referring to FIG. 3, one embodiment of the oil pressure controlling device according to the present invention for automatic transmission system, will be described by way of the main device for controlling the oil pressure employed to control these friction engagement devices in said automatic transmission system.

The oil, which pressure is controlled by the main oil pressure control device, is drawn from an oil sump 46 by the oil pump 26 via an oil filter 47 and an oil passage 402, and it is supplied to the torque converter 3, the direct coupling clutch 9 and also to each oil pressure chamber for activating each hydraulic piston for the front clutch 11, the rear clutch 12, the kick-down brake 14, the low reverse brake 15, and the 4th speed clutch 13. The control is made in response to the driving condition of the vehicle. The device mainly comprises an oil pressure regulator valve 50, a torque converter control valve 70, a control valve 90 for the direct coupling clutch, a reducing valve 110, a shift control valve 130, a manual valve 150, a 1st-2nd speed shift valve 170, a 2nd-3rd and 4th-3rd speed shift valve 190, and N-D control valve 210, a 4th speed clutch control valve 230, an oil pressure control valve 250, an N-R control valve 270, a rear clutch control valve 280 as a switch valve, and four solenoid valves 300, 310, 320 and 325. Among these valves, the 2nd-3rd and 4th-3rd shift valve 190, the oil pressure control valve 250, the N-R control valve 270, the rear clutch control valve 280 acting as a switch valve, and the solenoid valve 325 having an electronic control means 290 constitute the oil pressure control device 340 shown in FIG. 3 by the broken line. The elements are connected by oil passages.

The solenoid valves 300, 310 and 320, and the solenoid or electromagnetic valve 325 which constitutes the control device, are identical in structure and are of the type which closes when the current is cut off for controlling the opening/closing of orifices 301, 311, 321 and 326 by the electric signals from the electronic control device 290. They include solenoids 302, 312, 322 and 327, valves 303, 313, 333 and 328 provided in respective solenoids for opening/closing of the orifices 301, 321 and 326, and springs 304, 314, and 329 to urge said valves in the closing direction.

Moreover, the electronic control device 290, by which the oil pressure control device is constituted, at least employs means for detecting the start of the gear shift to detect the driving condition at the vehicle, and controls the oil pressure according to the signals from said detecting means. The said pressure control is carried out by controlling both the opening period of the solenoid valves within one cycle by varying the pulse-width of pulsating electric signal (fixed at a constant frequency between several to several tens of Hz, ex. 50 Hz), and actuation and suspension of the solenoid valves 300 and 325, according to said driving condition of the vehicle. At the same time, it also controls the opening/closing of the solenoid valves 310 and 320 for ON-OFF control. A means 330 which detects the negative pressure at the intake manifold or the degree of opening of the throttle valve (not shown) of the engine 1, a means 331 for detecting the revolution rate of the engine 1, a means 332 for detecting the rotational speed of the kick-down drum 25 shown in FIG. 1, a means 333 for detecting the rotational speed of the transfer driven gear 29 provided to detect the rotational speed of the output shaft 24, and a means 334 for measuring the temperature of the lubricant oil, a means 341 for detecting the position of the selector lever, and a means 342 for detecting the position of the auxiliary switch, etc. are the main input elements of the electronic control device for detecting the driving condition of the vehicle.

The oil pumped out from the oil pump 26 is supplied to the pressure regulator valve 50, the manual valve 150, the direct coupling clutch control valve 90 and the reducing valve 110 through the oil pass 401.

The pressure regulator valve 50 comprises a spool 53 having surfaces 51 and 52 to receive the pressure and a spring 54. When the manual valve 150 is set at the N or D position by the selector level, the oil pressure in the oil passage 401 is transmitted through said manual valve 150 and acts on the surface 51 via the oil passage 403 and an orifice 404. As a result, the oil pressure in the oil passage 401 is regulated to a constant pressure of 6 kg/cm$^2$ (this pressure is herein referred to as the line pressure). On the other hand, when the manual valve 150 is set at the position R, the oil pressure of the oil passage 401 acts on the surface 52 by passing through said manual valve 150, an oil passage 405 and an orifice 406, whereby the oil pressure in the oil passage 401 is regulated to 14.6 kg/cm². Note here that a release valve 407 provided in the oil passage 401 is an escape valve for releasing the high pressure oil discharged from the oil pump 26.

The oil introduced to the reducing valve 110 through the oil passage 401 is regulated to 2.4 kg/cm² by said valve and further distributed to oil passages 408 and 410.

The reducing valve 110 has a spool 111 and a spring 112, and controls the pressure by the balance between the oil pressure determined by the difference in area of surfaces 114 and 115 which are formed opposing the spool 111 and the spring force of the spring 112.

The pressure controlled oil is distributed through the oil passage 408 to the control side of the oil pressure control valve 250 and the N-R control valve 270 and the orifice 326 of the solenoid valve 325 via an orifice 426. By the action of the solenoid valve 325 which is controlled by the electronic control device 290, the oil pressure passing downstream of the orifice 426 in the oil passage is varied to produce an output pressure in oil passages 422 or 409 in correspondence with the driving conditions of the vehicle during shifting gears.

Various valves which constitute the oil pressure control device 340 will now be described.

The 2nd-3rd and 4th-3rd speed shift valve 190 comprises a spool 191 and a spring 192. An oil chamber 193 to which the line pressure is introduced is provided at the left of the spool; at its right is provided an oil chamber 194. The position of the spool is selectively switched between the left end as shown in FIG. 3 and the right end (not shown).

The oil pressure control valve 250 comprises a spool 254 having pressure receiving surfaces 251, 252 and 253 and a spring 255. The oil pressure in the oil passage 422 is controlled to a desired value by the balance of the oil pressure acting on the surface 251 and the force combined by the oil pressure caused by the difference in area between the surfaces 252 and 253 with the spring force of the spring 255.

The N-R control valve 270 comprises a spool 274 having pressure receiving surfaces 271, 272 and 273 and a spring 275. The oil pressure in an oil passage 409 is controlled to a desired value by the balance of the oil pressure acting on the surface 271 and the force combined by the oil pressure caused by the difference in area between the surfaces 252 and 253 with the spring force of the spring 275.

The oil pressure control valve 250 and the N-R control valve 270 are so constructed that when either one of them is in controlling operation state, the other not and operates as an accumulator to absorb the control pressure pulsation at the downstream of the orifice 426 of the oil passage 408 by the action of the spring 255 or 275 caused by the oil pressure acting on the surface 251 or 271. The output oil pressure distributed to the oil passage 422 controls the engagement and disengagement of the front clutch 11, the rear clutch 12, the kickdown brake 14 and the low reverse brake 15 during the forward driving. On the other hand, the output oil pressure distributed to the oil passage 409 controls the engagement and disengagement of the low reverse brake 15 during the reverse driving.

The electronic control device 290 detects the driving condition of the vehicle by the signals from a means 330 for detecting the engine load, means 331, 332 and 333 for detecting the rotational speed and a means 334 for detecting the oil temperature, which controls the opening/closing of the orifice 326 varying the pulsation ratio of the pulsating electric signal applied to the solenoid valve 325 depending on the detected driving conditions of the vehicle. The oil pressure Ps which acts on the pressure receiving surface 251 of the oil pressure control valve 250 or the surface 271 of the N-R control valve 270 is controlled by the solenoid valve 325 between about 0.3 to 2.1 kg/cm² when the orifice 426 is set at $0.8\phi$ and the orifice 326 at $1.4\phi$.

Figure 4:
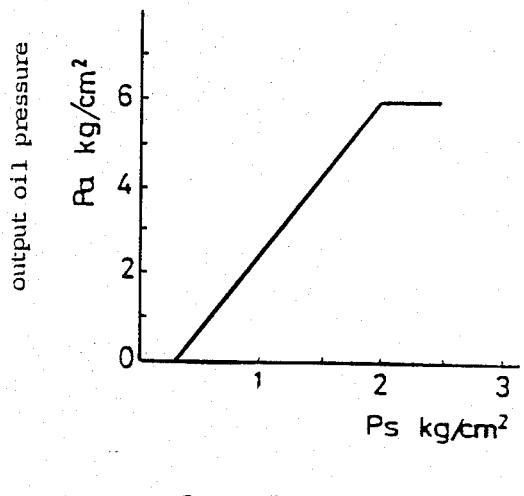
FIGS. 4 and 5 are the graphs showing the characteristics of the line oil pressure due to the increase/decrease of the oil pressure.
Figure 5:
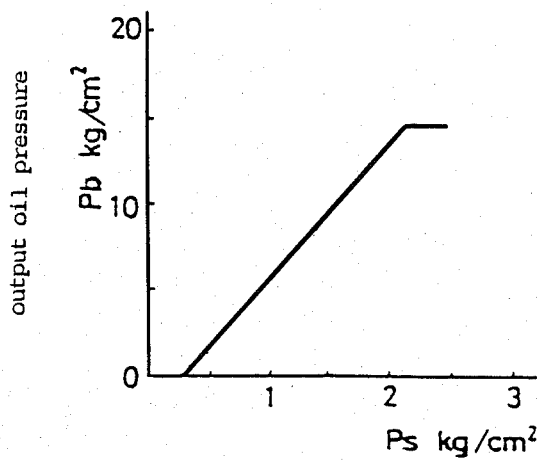

Thus, at the oil pressure control valve 250, when the line pressure of 6 kg/cm² supplied from the oil passage 414 is transmited to the oil passage 422 as an output oil pressure Pa by the oil pressure Ps, it is controlled between 0 to 6 kg/cm² as shown in FIG. 4. On the other hand, at the N-R control valve 270 when the oil pressure of 14.6 kg/cm² supplied from the oil passage 421 is transmitted to the oil passage 409 as an output oil pressure Pb, it is controlled between 0 to 14.6 kg/cm² as shown in FIG. 5.

The timing and the period of time for activating the solenoid valve 325 are also determined by the signals from a means for detecting the start of gear shifting, a means for detecting the timing of engagement comprising two rotational speed detectors 332 and 333 and the means employed in the electronic control device 290 and also said means 330, 331 and 334.

The rear clutch control valve 280 comprises a spool 291 having two lands 281 and 282 of different diameters and a spool 292 having three lands 283, 284 and 285 of the same diameter, and also as a spring 293 which is interposed in an oil chamber 294 located at the right end, and urges said spools 291 and 292 toward the left as in FIG. 3. An oil chamber 295 at the left end is connected with the shift control valve 130 through an oil passage 436, and an oil chamber 294 at the right end is connected with an oil passage 422. When the spools 291 and 292 are at the positions as shown in FIG. 3, communication between the 2nd-3rd and 4th-3rd shift valve 190 and the space between the lands 281 and 282 is established through the oil passage 456, the space between the lands 282 and 283 is communicated with the space between the lands 248 and 285 through the passage 257, and also communication between the passage 416 and the passage 417 connected to the rear clutch 12 is established through the valve 280.

Various valves constituting the main oil pressure control device will now be described.

The shift control valve 130 is controlled by selectively opening/closing a pair of ON/OFF controlled solenoid valves 310 and 320 to obtain 4 forward speeds. The shift control valve 130 comprises three spools 131, 132 and 133, and two stoppers 134 and 135. The spool 131, having two lands 136 and 137, is provided an oil passage 139 which connects an oil chamber 138 formed on the lefthandside at the land 136 with the space between the lands 136 and 137. The spool 132 is provided with two lands 140 and 141 having a different diameter each and a pressuring portion at both ends in abutment with the spools 131 and 133. Still further, the spool 133, having two lands 142 and 143, is provided an oil passage 145 which connects an oil chamber 144 formed on the righthandside of the lands 143 with the space between the lands 142 and 143. The stopper 134, formed with a hole to penetrate the pressuring portion at the end of the spool 131 therethrough, if fixed with the casing between the spools 131 and 132. And the stopper 135, formed with a hole to penetrate the pressuring portion at the end of the spool 132 therethrough, is fixed with the casing between the spools 132 and 133.

An oil passage 470, which is constantly connected to the space between the lands 140 and 141 of the spool 132, and is also connected to an oil passage 414 connected to the manual control valve 150. It is further connected to the orifice 311 which opens/closes by means of the solenoid valve 310 through the orifice 471 as well as to oil pressure chambers 138 and 144. Also, the oil passage 470 is connected to the orifice 321 which opens/closes by means of the solenoid valve 320, at the same time it is connected to the space between the spools 131 and 132 when they are at the positions as shown in FIG. 3. The spools 131, 132 and 133 are controlled by selectively opening/closing of the solenoid valves 310 and 320 for 4 forward speed shifting. The relation between opening/closing of the solenoid valves 310 and 320 with the consequent gear shift is shown in Table 1. In the table, the mark o denotes ON and x Off.

TABLE 1

|     | Solenoid Valve 310 | Solenoid Valve 320 |
| --- | --- | --- |
| 1st | o | o |
| 2nd | x | o |
| 3rd | x | x |
| 4th | o | x | the 1st-2nd speed shift valve 170 comprises a spool 171 and a spring 172 and acts to selectively switch the position of the spool 171 to the left end as in FIG. 3 or to the right end (not shown) by the difference between the pressuring force of the line pressure acting on the surface 173 at the left of the spool 171 and the spring force of the spring 172.

The N-D control valve 210 comprises a spool 211 having two lands 216 and 217 with a different diameter each and a spring 212. The position of the spool 211 is selectively switched to the left end as shown in FIG. 3 or to the right end (not shown) according to the combined force of the spring 212 and the oil pressure acting on pressure receiving surfaces 213 and 214 on both sides of the land 216 and the surface 215 of the land 317 facing the land 216.

The 4th speed clutch control valve 230 comprises a spool 231 having two lands 235 and 236 and a spring 232. An oil pressure chamber 233, in which the line pressure is applied is formed at the left of the land 235, and an oil pressure chamber 234 at the right of the land 236. The position of the spool 231 is selectively switched to the left end as in FIG. 3 or to the right end (not shown).

Control of gear shift by different combination of the friction engagement devices will be described in connection with the function of the oil pressure control device 340 according to the invention as well as the main oil pressure control system.

As the manual valve 150 is switched from N as shown in FIG. 3 to D, the line pressure regulated at 6 kg/cm$^3$ is applied from the oil passage 401 to the oil passage 414. The line pressure in the oil passage 414 is then applied to the oil pressure chamber of the rear clutch 12 through the oil pressure control valve 250, an oil passage 422, an N-D control valve 210, an oil passage 416, a rear clutch control valve 280 and an oil passage 417. At the same time, it is applied to the oil chamber of the low reverse brake 15 through the oil passage 422, the 1st-2nd shift valve 170 and the oil passage 453 to cause the rear clutch 12 and the low reverse brake 15 to engage for the 1st speed. In the course of this shifting operation, the oil pressure supplied to the rear clutch 12 is controlled by the oil pressure control valve 250 to prevent shocks. In other words, as the detecting means contained in the electronic control device 290 such as a computer detects the start of a shifting, the duty control of the solenoid valve 325 controlled by the electronic control device 290 acts to control the oil pressure Ps at downstream of the orifice 426 in the oil passage 408. It also changes the output oil pressure Pa supplied to the oil passage 422 from the oil passage 414 to prevent an abrupt rise of the oil pressure in the oil pressure chamber of the rear clutch 12 and prevent the shock. And at the time of shifting, the spool 274 of the N-R control valve 270, which connects with the oil passage 408 at downstream of the orifices 426, functions as an accumulator to absorb the fluctuation of the control oil pressure Ps.

When the oil pressure from the oil passage 422 is applied between the lands 216 and 217 of the N-D control valve 210, the spool 211 is moved to the right in FIG. 3 against the force of the spring 212 by the difference in area of the surfaces 214 and 215, and intercept the communication between the oil passages 422 and 416. On the other hand, the oil passage 414 is communicated with the oil passage 415 through the oil passage 415 which is interposed with the orifice 473. The oil passage 414 also communicates with the oil passage 474. As a result, as long as the manual valve 150 is retained at the D position, the oil passage 414 is communicated with the oil passage 416 by-passing the oil pressure control valve 250. And this prevents the oil pressure chamber of the rear clutch 12 from being influenced by reduction of the oil pressure during shifting, caused by the oil pressure control valve 250 and the solenoid valve 325, and prevents shock in shifting due to slip of the rear clutch 12 and other disadvantages such as over running of the engine.

Now, if the manual valve 150 is switched from N to D, the shift control valve 130 is also supplied with the oil pressure from oil passage 414. However, when the gear is at the first speed with the orifices 311 and 321 being open as both the solenoid valves 310 and 320 are energized, the oil pressure at downstream of orifices 471 and 472 becomes substantially 9 kg/cm$^2$ because of said orifices 471 and 472. The line pressure applied between the lands 140 and 141 of the spool 132 causes the spool 132 to move and stop at the leftmost end as in FIG. 3 by the force pressing to the left due to the difference in area of the lands 140 and 141.

As the vehicle gathers speed, the electronic control device 290 transmits a command signal to the solenoid valves 310 and 320 to achieve the second speed, then the solenoid valve 310 is de-energized and the solenoid valve 320 is kept energized.

By this switching, the line pressure oil in the oil passage 470 is applied to the oil chamber 138 through the orifice 471, the space between two lands of the spool 131, the oil passage 139, and to the oil chamber 144 through the orifice 147. The spool 131 moves toward the right integrally with the spool 132 and stops in abutment with the stopper 134. As a consequence, the line pressure in the oil passage 414 is distributed to the oil passage 412 through the lands 140 and 141 of the spool 132, and is applied to the oil pressure chamber 173 of the 1st-2nd speed shift valve 170 to cause the spool 171 to move toward the right end in FIG. 3. The line pressure is also applied to the oil pressure chamber 233 of the 4th-speed clutch control valve 230 to move the spool 231 to the right end as in FIG. 3. By said operation of the 1st-2nd speed shift valve 170, the line pressure in the oil passage 422 is supplied to the oil pressure chamber 423 at the coupling side of the kick-down brake 14 via the oil passage 428, whereby the rod 424 moves to the left in resistance to the spring 425 to engage the brake band (not shown) with the kick-down drum 25. On the other hand, the oil pressure in the oil passage 453 connecting with the 1st-2nd shift valve 170 is exhausted via the oil passage 409 connecting with the N-R control valve 270 to release the engagement of the low reverse brake 15 and to shift to the second speed.

During this shifting to the second speed, the oil pressure control valve 250 is operated by the oil pressure controlled by the solenoid valve 325 to reduce the oil pressure in the oil passage 422 and prevent the shock at the time of shifting.

When the electrical power supply to the solenoid valves 310 and 320 is cut off, in order to shift to the third speed by the command from the electronic control device 290, the line pressure is supplied to an intermediate position between the spools 131 and 132 in the shift control valve 130. The spool 132 moves toward the right in FIG. 3 by the line pressure acting on the left-end surface of the land 140 and stops with the abutment of the pressurizing portion against the spool 133. The oil passage 414 becomes communicated with the oil passage 430 so that the line pressure is applied to the oil pressure chamber 193 of the 2nd-3rd and 4th-3rd speed shift valve 190 to thereby switch the position of the spool 191 of the 2nd-3rd and 4th-3rd speed shift valve 190 to the right end.

At this time, the oil passage 428 connected with said shift valve 190 is communicated with the oil passage 432 through the orifice 429. The oil passage 423 is connected to the oil pressure chamber 234 formed at the right end of the 4th-speed clutch control valve 230 through the switch valve 452, and at the same time it is connected to the oil pressure chamber of the front clutch 11 through the switch valve 434, and to the oil pressure chamber 433 at the releasing side of the kick-down brake 12.

This structure, of which the oil passage 432 is connected the oil pressure chamber 433 at the releasing side of the kick-down brake 14 and to the oil pressure chamber of the front clutch 11, enables engaging and disengaging of the two with an overlap in time-wise.

Even in the course of shifting from the second to the third speed, the oil pressure control valve 250 acts exactly in the same manner as in shifting from the first to the second speed as described above to reduce the oil pressure supplied to the oil pass 422 for a short time. The orifice 429 is interposed in the oil pass 482, and when said oil pressure control valve 250 is in operation, the oil pressure both in the oil pressure chamber 433 and the oil pressure chamber of the front clutch 11 is maintained at the same low pressure by the action of the orifice 429, to cause the front clutch 11 to be engaged simultaneously with the disengagement of the kick-down brake 14. As the front clutch 11 starts to engage, the rotational speed of the input shaft 10 and the kick-down drum 25 gradually approach to and finally synchronizes at the rotational speed of the output shaft 24. When the said rotational speed detectors 332 and 333 detects the said synchronization or the moment just before the said synchronization and consider as shifting completed, operation of the oil pressure control valve 250 is suspended. The suspension of the oil pressure control valve 250 causes the oil pressure to increase to 6 kg/cm$^2$, and by this increased oil pressure the complete engagement of the front clutch 11 is established, and the third speed is obtained.

The increase of the oil pressure also increases the oil pressure in the oil pressure chamber 234 at the right end of the 4th-speed clutch control valve 230 so that the spool 231 is switched to the left end as shown in FIG. 3. The line pressure of the oil passage 430 is supplied to the 4th-speed clutch 13 through the oil passage 445 and the 4th speed clutch is engaged. The oil passage 445 connects with the oil chamber 234 through the switch valve 452 and the oil passage 451. Once the oil pressure is supplied to the oil passage 445, the spool 231 of the 4th speed clutch control valve 230 is retained at the left end as in FIG. 3 until the oil pressure in the oil pressure 445 is exhausted, thereby preventing such disadvantages as caused by release or slip of the 4th speed clutch 13, which hinders shifting or causes neutralization of the gear assembly 100, during shifting between the third and the fourth speed.

With the auxiliary switch positioned at D$_4$ and when the command for achieving the fourth speed from the electronic control device 290 energizes the solenoid valve 310, and deenergizes the solenoid valve 320 the oil pressure in the oil pressure chamber 144 of the shift control valve 130 is reduced to cause the spool 133 to move toward the rightmost end as in FIG. 3 together with the spool 132. As a result, the line pressure in the oil passage 414 is distributed to the oil pressure chamber 295 of the rear clutch control valve 280 via the oil passage 436 and to the oil passage 445 through the check valve 235. With this supply of the line pressure to the oil pressure chamber 294, the spools 291 and 292 move toward the right in resistance to the spring 293 and come to a stop at the right end as in FIG. 3. Therefore, the oil passage 417 connected with the rear clutch 12 is communicated with the exhaust port to cause the rear clutch 12 to be disengaged immediately. Also, the communication is established between the oil passages 436 and 456 via the oil chamber 295, whereby the line pressure is supplied to the oil chamber 194 of the 2nd-3rd and 4th-3rd shift valve 190 and the spool 191 is switched to the left end as in FIG. 3. As a result, the oil in the oil pressure chamber of the front clutch 11 and in the oil pressure chamber 433 of the kick-down brake 14 is respectively discharged from the exhaust port in the shift valve 190 for 2nd-3rd and 4th-3rd speed through the orifice 196 to disengage the front clutch 11, whereby the kick-down brake 14 is engaged. As in the case of shifting from 1st to 2nd or 2nd to 3rd speed mentioned above, the oil pressure control valve 250 is operated to reduce the oil pressure in the oil passage 422 for a short period of time during gear shifting. This reduces the oil pressure acting on the oil pressure chamber 423 so that the engagement of the kick-down brake 14 is made smoothly. And when the oil pressure rises to 6 kg/cm$^2$, the engagement is completed and the fourth speed is obtained.

Under this condition, the oil pressure in the oil chamber 294 is exhausted, and at the same time, the line pressure in the oil passage 416 is applied to the space between the lands 282 and 283, so that the line pressure acts on the left end surface of the land 283 of the spool 292 to retain the spool at the right end.

Referring now to the downward shifting, especially shifting from the 4th to the 3rd speed will be described as it is the object of application of the present invention.

When the solenoid valves 310 and 320 are de-energized in order to shift from the 4th to the 3rd speed by the command from the electronic control device 290, the line pressure in the oil chamber 295 of the rear clutch control valve 280 is exhausted through the oil passage 436, the spool 291 is moved to the leftmost end by the line pressure from the oil pass 416 acting on the right end surface of the land 282. This in turn causes the oil passage 456 to communicate with the exhaust port via the space between the lands 281 and 282 of the spool 291 to thereby discharge the oil from the oil pressure chamber 194 at the right of the 2nd-3rd and 4th-3rd speed shift valve 190. The line pressure from the oil passage 430 now acts on the oil chamber 193 at the left end of the valve 190 to cause the spool 191 to move toward the right end overwhelming the force of the spring 192. As a result, the oil passes 428 and 432 to which the oil pressure reduced by the oil pressure control valve 250 during shifting is supplied are communicated, and the oil pressure is supplied to the oil pressure chamber 433 at the releasing side of the kick-down brake 14 and also to the front clutch 11. Since the oil pressure is supplied via the orifice 429 in either case, the kick-down brake 14 is disengaged by means of the spring 425 and the front clutch having smaller torque transmitting capacity is gradually engaged.

At this stage, the oil pressure reduced by the oil pressure control valve 250 is supplied to the oil chamber 294 at the right end of the rear clutch 280, and act on the land 285 of the spool 292. The spool 292, however, remains at the right end as the line pressure from the oil passage 416 acts on the land 283 thereof. Direct drive (3rd speed) of the gear assembly 100 is obtained when the 4th speed clutch 13 which has been engaged at the time of obtaining the 4th speed and the front clutch 11 are both engaged. And when the synchronization of the kick-down drum 25 and the transfer driven gear 29 is detected by the rotational speed detectors 332 and 333, the oil pressure reducing action of the oil pressure control valve 250 is suspended by means of the electronic control device 290. As a result, the line pressure is supplied to the oil pressure chamber 294 of the rear clutch control valve 280 and the spool 292 is made to move toward the left to a position as in FIG. 3 by the force of the spring 293. As a consequence, the oil passage 416 is communicated with the oil passage 417, which connects with the rear clutch 12, to thereby engage the rear clutch having large torque transmitting capacity and the gear shift to the 3rd speed, is completed.

As has been mentioned above, smooth and shockless shifting is established on shifting down from the 4th to the 3rd speed, by first disengaging the kick-down brake 14, and engaging the front clutch 11 having a smaller torque transmitting capacity by applying a relatively low oil pressure, and when the synchronization is detected (i.e. the 3rd speed substantially obtained), the value of said low oil pressure applied to the front clutch 11 is increased. And then the rear clutch 12 having a larger torque transmitting capacity is engaged by switching the rear clutch control valve 280, which operate as a switch valve, responding to the increased oil pressure applied to the front clutch 11 (i.e. the 3rd speed completely obtained).

Description on the other downward gear shiftings is omitted since the procedure is merely in reverse as that of the upward shifting.

I claim:

1. A hydraulic control system in an automatic transmission with 4 forward speeds including 1st, 2nd, 3rd and 4th speed comprising 3 clutches including at least a 4th-speed clutch for achieving the 4th speed of overdrive by connecting an input shaft with the carrier of a ravigneawx type planetary gear set and two brakes characterized in that a rotational speed detecting means which detects the synchronization of two arbitrary rotary elements of said ravigneawx type planetary gear set when the engagement of a brake for the 4th speed is disengaged and one of two clutches for the 3rd speed having a smaller torque transmitting capacity is engaged, an hydraulic control means which reduces the oil pressure to be supplied to said clutches or brakes during the gear shift and which is capable of increasing said oil pressure in response to the detected synchronzation with signals from said rotational speed detecting means, and a switch valve which switches to start the oil pressure supply to the other clutch for the 3rd speed having the greater torque transmitting capacity in response to the increase in the oil pressure in said smaller torque transmitting clutch.

2. The hydraulic control system in an automatic transmission with 4 forward speeds as claimed in claim 1 wherein said two arbitrary rotary elements are a sun gear which acts as a reaction force element at the time of shifting to the 2nd gear and an annulus gear which is coupled to the output shaft.

3. The hydraulic control system in an automatic transmission with 4 forward speeds as claimed in claim 1 wherein said hydraulic control means including an oil pressure control valve which is provided at an intermediate point in an oil passage connecting an oil pressure source with said clutches and brakes and which is so constructed as to control the value of the oil pressure to be supplied to said clutches and brakes in accordance with the controlled oil pressure, an electromagnetic valve which is capable of controlling the value of said controlled oil pressure by controlling the opening/closing of an exhaust port provided between said oil pressure control valve and an orifice located in an oil passage connecting said oil pressure source and said oil pressure control valve, and an electronic control device which periodically operates said electromagnetic valve during gear shifting and which suspends the operation of said electromagnetic valve by detecting said synchronization with the detection signals from said rotational speed detecting means.

* * * * *